United States Patent [19]

Nakamura

[11] Patent Number: 4,525,040
[45] Date of Patent: Jun. 25, 1985

[54] LENS SYSTEM FOR OPTICAL RECORDING TYPE DISKS

[75] Inventor: Toru Nakamura, Tokyo, Japan

[73] Assignee: Olympus Optical Co., Ltd., Tokyo, Japan

[21] Appl. No.: 501,786

[22] Filed: Jun. 7, 1983

[30] Foreign Application Priority Data

Jun. 16, 1982 [JP] Japan .................... 57-102169

[51] Int. Cl.$^3$ .......................... G02B 3/02; G02B 9/06
[52] U.S. Cl. ................................. 350/480; 350/432
[58] Field of Search .............................. 350/480, 432

[56] References Cited

U.S. PATENT DOCUMENTS 3,877,792  4/1975  Cox et al. .................... 350/432
4,002,406  1/1977  Sussman .................... 350/432

FOREIGN PATENT DOCUMENTS 55-45084  3/1980  Japan .

Primary Examiner—John K. Corbin
Assistant Examiner—Rebecca D. Gass
Attorney, Agent, or Firm—Cushman, Darby & Cushman

[57] ABSTRACT

A lens system for optical recording type disks comprising a first lens and a second lens wherein the first lens is a positive lens and the second lens is a positive lens, the lens system for optical recording type disks being arranged that the entrance surface of the first lens is an aspherical surface, the working distance is long and aberrations are corrected favorably.

5 Claims, 5 Drawing Figures

LENS SYSTEM FOR OPTICAL RECORDING TYPE DISKS

BACKGROUND OF THE INVENTION (a) Field of the Invention:

The present invention relates to a lens system for optical recording type disks which is small in size and light in weight.

(b) Description of the prior art:

For a lens system to be used for optical recording type disks, it is necessary to make the resolving power $1\mu$ or less because the lens system is used for reading out the very small signals recorded with high density on the disk. To obtain a lens system with the resolving power of $1\mu$ or less as mentioned in the above, spherical aberration and sine condition should be made as small as possible. As the automatic tracking method for optical recording type disks, two methods are known, i.e., a method to vibrate the light beam by using a galvanomirror and a method to move the lens system itself in parallel with the disk surface. The lens system for optical recording type disks according to the present invention is to be used for a device for optical recording type disks employing the latter tracking method. Therefore, the lens system should be light in weight and paraxial aberrations thereof should be corrected favourably.

Furthermore, if the lens system for optical recording type disks comes into contact with the disk, the disk and lens system are broken. To prevent the above, the lens system for optical recording type disks should have a long working distance. Besides, it is preferable to make the number of lenses constituting the lens system smaller.

SUMMARY OF THE INVENTION

It is, therefore, a primary object of the present invention to provide a lens system for optical recording type disks which has an extremely simple lens configuration with an extremely small number of lenses, i.e., two lenses, and which is arranged that the working distance thereof is long and aberrations thereof are corrected favourably.

The lens system according to the present invention has the lens configuration as shown in FIG. 1, i.e., it comprises a first and second lenses wherein the first lens is a positive lens and the second lens is a positive lens, the lens system being arranged that the focal length $f_1$ of the first lens fulfills the condition (1) shown below:

$$2.0 < f_1/f < 3.0 \quad (1)$$

where, reference symbol f represents the focal length of the lens system as a whole.

The lens system according to the present invention is further arranged that the entrance surface of the first lens is an aspherical surface. The shape of said aspherical surface is expressed by a formula of aspherical surface which includes at least the term proportional to the sixth power of the incidence height, the vertex portion (portion near the optical axis) of said aspherical surface being approximately a spherical surface.

To obtain a long working distance, which is one of objects of the present invention, with the lens system having the lens configuration as described in the above, the refractive power of the first lens should be made weak. When, however, the refractive power of the first lens is made too weak, the refractive power of the second lens should be necessarily made strong in order to ensure the desired value of refractive power for the lens system as a whole, and this is not preferable for correction of aberrations. The condition (1) is to define the refractive power of the first lens taking the above-mentioned points into consideration. If, in the condition (1), $f_1$ becomes smaller than 2.0 f, the working distance becomes short. If $f_1$ becomes larger than 3.0 f and the power of the first lens becomes weak, the power of the second lens should be necessarily made strong. As a result, spherical aberration will be largely caused by the second lens and spherical aberration of the lens system as a whole will become unfavourable.

The entrance surface of the first lens constituting the lens system according to the present invention is arranged as an aspherical surface expressed by the formula shown below wherein reference symbol x represents the distance from an arbitrary point on said surface to the tangential plane which is tangential to said surface at the point thereof on the optical axis.

$$x = \frac{\frac{y^2}{r}}{1 + \sqrt{1 - \left(\frac{y}{r}\right)^2}} + Ey^4 + Fy^6 + Gy^8 \ldots$$

In the formula of aspherical surface shown in the above, reference symbol y represents the distance from the arbitrary point on said aspherical surface to the optical axis, and reference symbols E, F and G respectively represent coefficients of aspherical surface in the terms of the fourth power, sixth power and eighth power.

When the aspherical surface expressed by the above-mentioned formula including up to the term of the second power is used as the entrance surface of the first lens, it is possible to correct spherical aberration. In that case, however, the sine condition becomes considerably unfavourable. To correct the sine condition, it is necessary to arrange the entrance surface of the first lens as the aspherical surface expressed by the above-mentioned formula including up to the terms of the sixth power. As described in the above, it is possible to correct both of spherical aberration and sine condition by using the aspherical surface expressed by the above-mentioned formula including up to the term of the sixth power as the first surface of the lens system according to the present invention. Especially in case of a lens system with a short overall length like the lens system according to the present invention, powers of respective lenses become necessarily strong and, consequently, correction of aberrations become difficult. Therefore, when the aspherical surface expressed by the formula including up to the term of the fourth power is adopted, it is not always possible to correct aberrations satisfactorily favourably.

As explained so far, by arranging the lens system to fulfill the condition (1) and arranging the entrance surface of the first lens as an aspherical surface, it is possible to obtain a lens system for optical recording type disks with a short overall length not exceeding 0.8 f and with favourable performance.

When, however, said lens system is arranged to further fulfill the conditions (2) and (3) shown below, it is possible to make bulging of aberration curves especially those of spherical aberration and sine condition small.

$$-0.12 < Ef^3 < -0.06 \quad (2)$$

$$-0.15 < Ef^5 < -0.08 \quad (3)$$

In the conditions shown in the above, reference symbols E and F respectively represent coefficients of aspherical surface in the terms respectively of the fourth power and the sixth power of the incidence height y in the formula which expresses the aspherical surface for the first surface.

If, in the conditions (2) and (3) shown in the above, $Ef^3$ and/or $Ef^5$ becomes larger than the upper limit thereof or smaller than the lower limit thereof, it is not possible to correct spherical aberration and sine condition satisfactorily favourably.

DETAILED DESCRIPTION OF THE PREFERRED EMBODIMENTS

Figure 1:
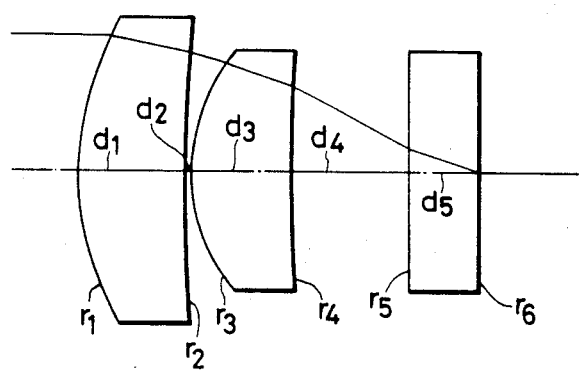
FIG. 1 shows a sectional view of the lens system for optical recording type disks according to the present invention.
Figure 3:
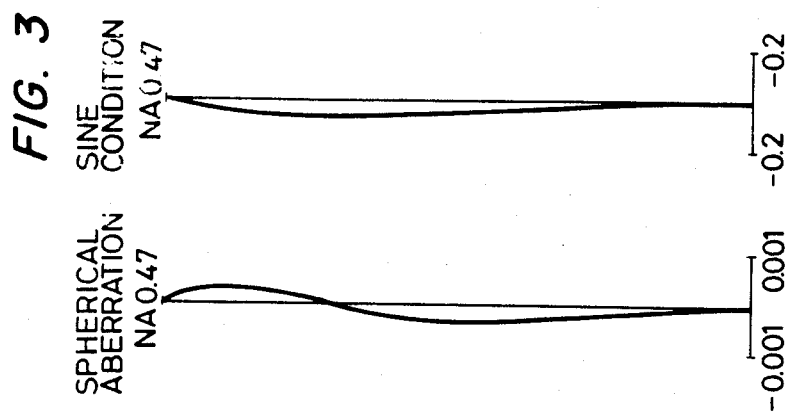
FIGS. 2 through 5 respectively show graphs illustrating aberration curves of Embodiments 1 through 4 of the lens system according to the present invention.
Figure 2:
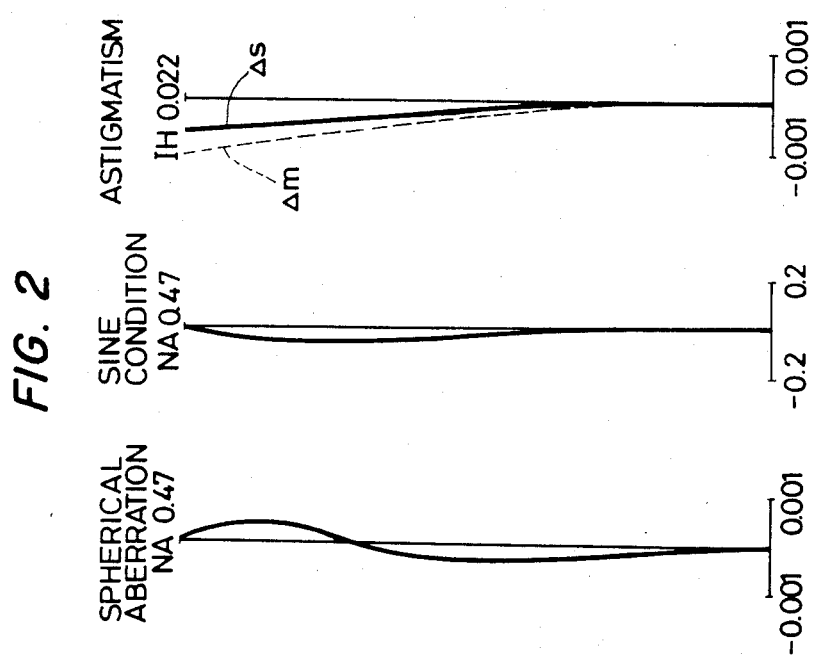
Figure 5:
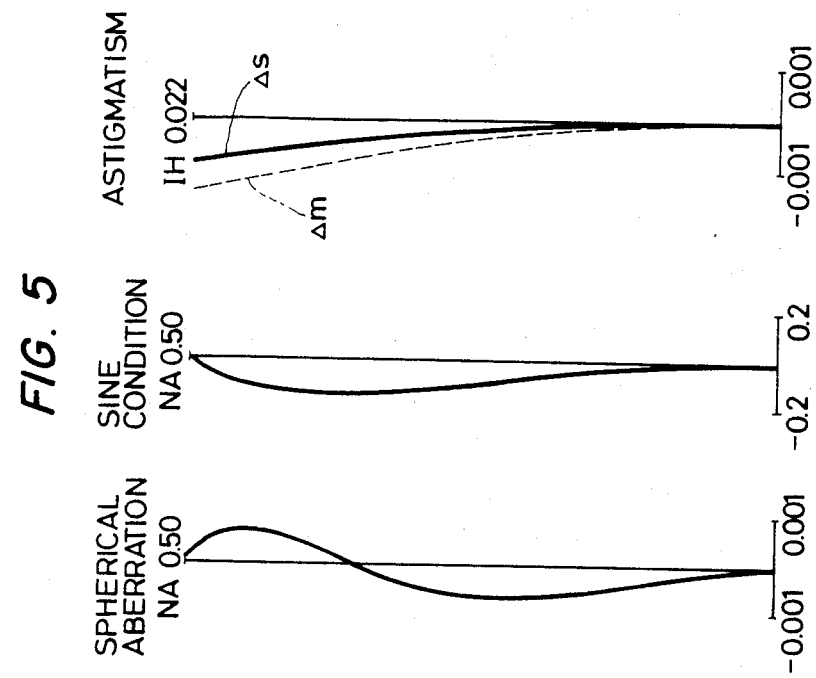
Figure 4:
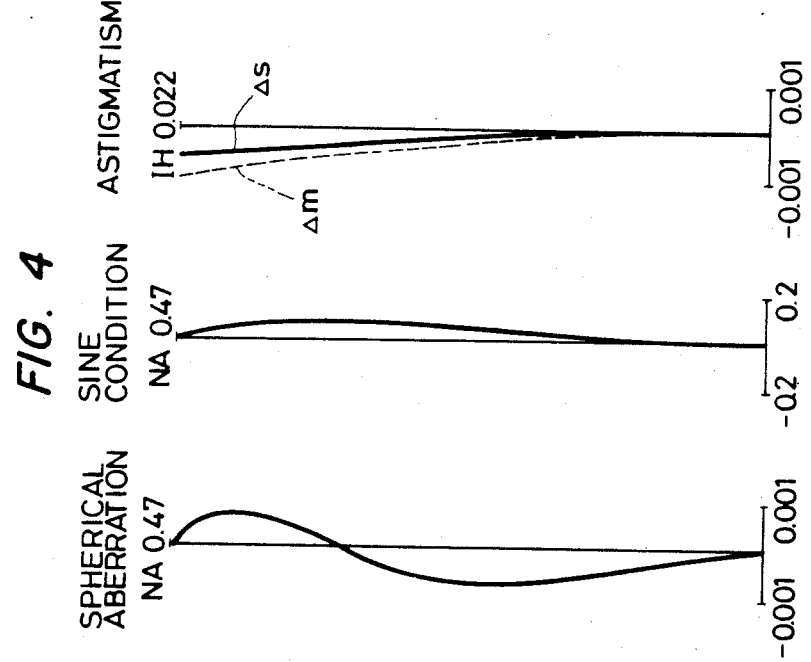

Now, preferred embodiments of the lens system for optical recording type disks according to the present invention are shown below.

| Embodiment 1 | | | |
|---|---|---|---|
| f = 1.0, | NA = 0.47 | | |
| $r_1$ = 1.2493 | | | |
| $d_1$ = 0.3913 | $n_1$ = 1.51032 | $\nu_1$ = 64.15 | |
| $r_2$ = 15.6605 | | | |
| $d_2$ = 0.0217 | | | |
| $r_3$ = 0.6728 | | | |
| $d_3$ = 0.3696 | $n_2$ = 1.51032 | $\nu_2$ = 64.15 | |
| $r_4$ = 6.2493 | | | |
| $d_4$ = 0.4534 | | | |
| $d_5$ = 0.2609 | $n_3$ = 1.48821 | $\nu_3$ = 66.13 | |
| E = −0.087895, | F = −0.10181 | | |
| $f_1$ = 2.636, | $f_2$ = 1.445, | $\Sigma d$ = 0.7826 | |
| Embodiment 2 | | | |
| f = 1.0 | NA = 0.47 | | |
| $r_1$ = 1.2284 | | | |
| $d_1$ = 0.3913 | $n_1$ = 1.48421 | $\nu_1$ = 57.45 | |
| $r_2$ = −128.3837 | | | |
| $d_2$ = 0.0217 | | | |
| $r_3$ = 0.6522 | | | |
| $d_3$ = 0.3696 | $n_2$ = 1.48421 | $\nu_2$ = 57.45 | |
| $r_4$ = 5.3566 | | | |
| $d_4$ = 0.4494 | | | |
| $d_5$ = 0.2609 | $n_3$ = 1.48821 | $\nu_3$ = 66.13 | |
| E = −0.093090, | F = −0.10297 | | |
| $f_1$ = 2.515, | $f_2$ = 1.495, | $\Sigma d$ = 0.7826 | |
| Embodiment 3 | | | |
| f = 1.0, | NA = 0.47 | | |
| $r_1$ = 0.9557 | | | |
| $d_1$ = 0.3783 | $n_1$ = 1.76466 | $\nu_1$ = 25.68 | |
| $r_2$ = 1.9293 | | | |
| $d_2$ = 0.0217 | | | |
| $r_3$ = 0.8108 | | | |
| $d_3$ = 0.3804 | $n_2$ = 1.51032 | $\nu_2$ = 64.15 | |
| $r_4$ = −21.7391 | | | |
| $d_4$ = 0.3944 | | | |
| $d_5$ = 0.2609 | $n_3$ = 1.48821 | $\nu_3$ = 66.13 | |
| E = −0.078681, | F = −0.13790 | | |
| $f_1$ = 2.12, | $f_2$ = 1.54, | $\Sigma d$ = 0.7804 | |
| Embodiment 4 | | | |
| f = 1.0 | NA = 0.50 | | |
| $r_1$ = 1.2923 | | | |
| $d_1$ = 0.26 | $n_1$ = 1.51032 | $\nu_1$ = 64.15 | |
| $r_2$ = 18.2998 | | | |
| $d_2$ = 0.04 | | | |
| $r_3$ = 0.6728 | | | |
| $d_3$ = 0.3374 | $n_2$ = 1.51032 | $\nu_2$ = 64.15 | |
| $r_4$ = 5.3631 | | | |
| $d_4$ = 0.518 | | | |
| $d_5$ = 0.24 | $n_3$ = 1.48821 | $\nu_3$ = 66.13 | |
| E = −0.091134, | F = −0.12058 | | |
| $f_1$ = 2.711, | $f_2$ = 1.472, | $\Sigma d$ = 0.6374 | |

In embodiments shown in the above, reference symbols $r_1, r_2, r_3$ and $r_4$ respectively represent radii of curvature of respective lens surfaces ($r_1$ represents the radius of curvature in the portion near the optical axis), reference symbols $d_1$ and $d_3$ respectively represent thicknesses of the first and second lenses, reference symbol $d_2$ represents the airspace between the first and second lenses, reference symbol $d_4$ represents a value corresponding to the working distance, reference symbol $d_5$ represents the thickness of the cover glass, reference symbols $n_1$ and $n_2$ respectively represent refractive indices of the first and second lenses for the light with the wavelength of 800 nm, reference symbol $n_3$ represents the refractive index of the cover glass for the light with the wavelength of 800 nm, reference symbols $\nu_1$ and $\nu_2$ respectively represent Abbe's numbers of the first and second lenses at d-line, reference symbol $\nu_3$ represents Abbe's number of the cover glass at d-line, reference symbols $f_1$ and $f_2$ respectively represent focal lengths of the first and second lenses, and reference symbol $\Sigma d$ represents the distance $(d_1 + d_2 + d_3)$ from the first surface to the final surface of the lens system.

Out of respective embodiments shown in the above, Embodiment 2 employs plastics for both of the first lens and second lens. When plastics are used as mentioned in the above, it is possible to make the lens system still lighter in weight and, at the same time, to reduce the cost. However, when plastics are used, it is impossible to make the lenses very thin. Therefore, the lenses should be arranged to have thicknesses of the degree as shown in this embodiment. On the other hand, when the lenses are made of glass materials, they can be made thinner than in the case of plastics and, consequently, it is possible to make the lens system still smaller. Embodiment 4 illustrates a lens system which is made smaller by making the thicknesses of the lenses small.

Respective embodiments shown in the above are designed on the assumption that parallel rays enter the lens system from the first lens side.

I claim:

1. A lens system for optical recording type disks comprising a first lens and a second lens wherein said first lens is a positive lens and said second lens is a positive lens, said lens system for optical recording type disks being arranged to fulfill the condition (1) shown below and the entrance surface of said first lens being arranged as an aspherical surface expressed by a formula of aspherical surface including the term proportional to the sixth power of the incidence height, the vertex portion of said aspherical surface being approximately a spherical surface;

$$2.0 < f_1/f < 3.0 \quad (1)$$

where, reference symbol f represents the focal length of the lens system as a whole, and reference symbol $f_1$ represents the focal length of the first lens, wherein said aspherical surface is expressed by the following formula:

$$x = \frac{\frac{y^2}{r}}{1+\sqrt{1-\left(\frac{y}{r}\right)^2}} + Ey^4 + Fy^6 + Gy^8 \ldots$$

where, reference symbol r represents the radius of curvature of the vertex portion of said aspherical surface, reference symbol x represents the distance from an arbitrary point on said aspherical surface to the tangential plane which is tangential to said aspherical surface at the point thereof on the optical axis, reference symbol y represents the distance from said arbitrary point to the optical axis, and reference symbols E, F, G, ... respectively represent coefficients of aspherical surface:
said coefficients of aspherical surface E and F respectively fulfilling the conditions (2) and (3) shown below:

$$-0.12 < Ef^3 < -0.06 \quad (2)$$

$$-0.15 < Ef^5 < -0.08 \quad (3)$$

2. A lens system for optical recording type disks according to claim 1, in which said lens system for optical recording type disks has the folloing numerical data:

| | | |
|---|---|---|
| f = 1.0, | NA = 0.47 | |
| $r_1$ = 1.2493 | | |
| $d_1$ = 0.3913 | $n_1$ = 1.51032 | $\nu_1$ = 64.15 |
| $r_2$ = 15.6605 | | |
| $d_2$ = 0.0217 | | |
| $r_3$ = 0.6728 | | |
| $d_3$ = 0.3696 | $n_2$ = 1.51032 | $\nu_2$ = 64.15 |
| $r_4$ = 6.2493 | | |
| $d_4$ = 0.4534 | | |
| $d_5$ = 0.2609 | $n_3$ = 1.48821 | $\nu_3$ = 66.13 |
| E = −0.087895, | F = −0.10181 | |
| $f_1$ = 2.636, | $f_2$ = 1.445, | $\Sigma d$ = 0.7826 | where, reference symbols $r_1$, $r_2$, $r_3$ and $r_4$ respectively represent radii of curvature of respective lens surfaces (reference symbol $r_1$ represents the radius of curvature of the vertex portion of the aspherical surface), reference symbols $d_1$ and $d_3$ respectively represent thicknesses of the first and second lenses, reference symbol $d_2$ represents the airspace between the first and second lenses, reference symbol $d_4$ represents a distance corresponding to the working distance, reference symbol $d_5$ represents the thickness of the cover glass, reference symbols $n_1$ and $n_2$ respectively represent refractive indices of the first and second lenses for the light with the wavelength of 800 nm, reference symbol $n_3$ represents the refractive index of the cover glass for the light with the wavelength of 800 nm, reference symbols $\nu_1$ and $\nu_2$ respectively represent Abbe's numbers of the first and second lenses at d-line, reference symbol $\nu_3$ represents Abbe's number of the cover glass at d-line, reference symbols $f_1$ and $f_2$ respectively represent focal lengths of the first and second lenses, and reference symbol $\Sigma d$ represents the distance from the first surface to the final surface of the lens system.

3. A lens system for optical recording type disks according to claim 1, in which said lens system for optical recording type disks has the following numerical data:

| | | |
|---|---|---|
| f = 1.0, | NA = 0.47 | |
| $r_1$ = 1.2284 | | |
| $d_1$ = 0.3913 | $n_1$ = 1.48421 | $\nu_1$ = 57.45 |
| $r_2$ = −128.3837 | | |
| $d_2$ = 0.0217 | | |
| $r_3$ = 0.6522 | | |
| $d_3$ = 0.3696 | $n_2$ = 1.48421 | $\nu_2$ = 57.45 |
| $r_4$ = 5.3566 | | |
| $d_4$ = 0.4494 | | |
| $d_5$ = 0.2609 | $n_3$ = 1.48821 | $\nu_3$ = 66.13 |
| E = −0.093090, | F = −0.10297 | |
| $f_1$ = 2.515, | $f_2$ = 1.495, | $\Sigma d$ = 0.7826 | where, reference symbols $r_1$, $r_2$, $r_3$ and $r_4$ respectively represent radii of curvature of respective lens surfaces (reference symbol $r_1$ represents the radius of curvature of the vertex portion of the aspherical surface), reference symbols $d_1$ and $d_3$ respectively represent thicknesses of the first and second lenses, reference symbol $d_2$ represents the airspace between the first and second lenses, reference symbol $d_4$ represents a distance corresponding to the working distance, reference symbol $d_5$ represents the thickness of the cover glass, reference symbols $n_1$ and $n_2$ respectively represent refractive indices of the first and second lenses for the light with the wavelength of 800 nm, reference symbol $n_3$ represents the refractive index of the cover glass for the light with the wavelength of 800 nm, reference symbols $\nu_1$ and $\nu_2$ respectively represent Abbe's numbers of the first and second lenses at d-line, reference symbol $\nu_3$ represents Abbe's number of the cover glass at d-line, reference symbols $f_1$ and $f_2$ respectively represent focal lengths of the first and second lenses, and reference symbol $\Sigma d$ represents the distance from the first surface to the final surface of the lens system.

4. A lens system for optical recording type disks according to claim 1, in which said lens system for optical recording type disks has the following numerical data:

| | | |
|---|---|---|
| f = 1.0 | NA = 0.47 | |
| $r_1$ = 0.9557 | | |
| $d_1$ = 0.3783 | $n_1$ = 1.76466 | $\nu_1$ = 25.68 |
| $r_2$ = 1.9293 | | |
| $d_2$ = 0.0217 | | |
| $r_3$ = 0.8108 | | |
| $d_3$ = 0.3804 | $n_2$ = 1.51032 | $\nu_2$ = 64.15 |
| $r_4$ = −21.7391 | | |
| $d_4$ = 0.3944 | | |
| $d_5$ = 0.2609 | $n_3$ = 1.48821 | $\nu_3$ = 66.13 |
| E = −0.078681, | F = −0.13790 | |
| $f_1$ = 2.12, | $f_2$ = 1.54, | $\Sigma d$ = 0.7804 | where, reference symbols $r_1$, $r_2$, $r_3$ and $r_4$ respectively represent radii of curvature of respective lens surfaces (reference symbol $r_1$ represents the radius of curvature of the vertex portion of the aspherical surface), reference symbols $d_1$ and $d_3$ respectively represent thicknesses of the first and second lenses, reference symbol $d_2$ represents the airspace between the first and second lenses, reference symbol $d_4$ represents a distance corresponding to the working distance, reference symbol $d_5$ represents the thickness of the cover glass, reference symbols $n_1$ and $n_2$ respectively represent refractive indices of the first and second lenses for the light with the wavelength of 800 nm, reference symbol $n_3$ represents the refractive index of the cover glass for the light with the wavelength of 800 nm, reference symbols $\nu_1$ and $\nu_2$ respectively represent Abbe's numbers of the first and second lenses at d-line, reference symbol $\nu_3$ represent Abbe's number of the cover glass at d-line, reference symbols $f_1$ and $f_2$ respectively represent focal lengths of the first and second lenses, and reference symbol $\Sigma d$ represents the distance from the first surface to the final surface of the lens system.

5. A lens system for optical recording type disks according to claim 1, in which said lens system for optical recording type disks has the following numerical data:

| | | |
|---|---|---|
| f = 1.0, | NA = 0.50 | |
| $r_1$ = 1.2923 | | |
| $d_1$ = 0.26 | $n_1$ = 1.51032 | $\nu_1$ = 64.15 |
| $r_2$ = 18.2998 | | |
| $d_2$ = 0.04 | | |
| $r_3$ = 0.6728 | | |
| $d_3$ = 0.3374 | $n_2$ = 1.51032 | $\nu_2$ = 64.15 |
| $r_4$ = 5.3631 | | |
| $d_4$ = 0.518 | | |
| $d_5$ = 0.24 | $n_3$ = 1.48821 | $\nu_3$ = 66.13 |
| E = −0.091134, | F = −0.12058 | |

| -continued | | |
|---|---|---|
| $f_1$ = 2.711, | $f_2$ = 1.472, | $\Sigma d$ = 0.6374 | where, reference symbols $r_1$, $r_2$, $r_3$ and $r_4$ respectively represent radii of curvature of respective lens surfaces (reference symbol $r_1$ represents the radius of curvature of the vertex portion of the aspherical surface), reference symbols $d_1$ and $d_3$ respectively represent thicknesses of the first and second lenses, reference symbol $d_2$ represents the airspace between the first and second lenses, reference symbol $d_4$ represents a distance corresponding to the working distance, reference symbol $d_5$ represents the thickness of the cover glass, reference symbols $n_1$ and $n_2$ respectively represent refractive indices of the first and second lenses for the light with the wavelength of 800 nm, reference symbol $n_3$ represents the refractive index of the cover glass for the light with the wavelength of 800 nm, reference symbols $\nu_1$ and $\nu_2$ respectively represent Abbe's numbers of the first and second lenses at d-line, reference symbol $\nu_3$ represents Abbe's number of the cover glass at d-line, reference symbols $f_1$ and $f_2$ respectively represent focal lengths of the first and second lenses, and reference symbol $\Sigma d$ represents the distance from the first surface to the final surface of the lens system.

* * * * *